United States Patent
Koopmans et al.

(10) Patent No.: US 7,282,141 B2
(45) Date of Patent: Oct. 16, 2007

(54) MIXER AND PROCESS CONTROLLER FOR USE IN WASTEWATER TREATMENT PROCESSES

(76) Inventors: Richard J. Koopmans, 15035 SE. 46th St., Bellevue, WA (US) 98006-2568; Kristinn G. Drewry, 15035 SE. 46th St., Bellevue, WA (US) 98006-2568

( * ) Notice: Subject to any disclaimer, the term of this patent is extended or adjusted under 35 U.S.C. 154(b) by 0 days.

(21) Appl. No.: 11/433,801

(22) Filed: May 12, 2006

(65) Prior Publication Data
US 2006/0254979 A1 Nov. 16, 2006

Related U.S. Application Data

(60) Provisional application No. 60/681,717, filed on May 16, 2005.

(51) Int. Cl.
*C02F 3/00* (2006.01)
(52) U.S. Cl. .................. 210/143; 210/150; 210/220; 210/741
(58) Field of Classification Search ............. 210/741, 210/220, 143, 150
See application file for complete search history.

(56) References Cited

U.S. PATENT DOCUMENTS

| | | | |
|---|---|---|---|
| 4,595,296 A | 6/1986 | Parks | |
| 6,280,636 B1 | 8/2001 | Locklair | |
| 6,372,140 B2 | 4/2002 | Kelly | |
| 6,475,395 B1 * | 11/2002 | Schmit et al. | 210/741 |
| 6,629,773 B2 | 10/2003 | Parks | |
| 6,896,804 B2 | 5/2005 | Haerther et al. | |
| 7,005,068 B2 | 2/2006 | Hoffland | |

* cited by examiner

*Primary Examiner*—Chester T. Barry

(57) ABSTRACT

A system and method of wastewater treatment in a tank provides large mixing bubbles generated in the lower portion of the tank. In embodiments providing aerobic wastewater treatment, the system further provides oxygen to the wastewater by way of tiny aerating bubbles provided by diffusers. At least one sensor in the tank provides measurements of at least one wastewater treatment parameter such as total suspended solids, dissolved oxygen, ammonium or nitrate. An automatic controller in the system, responsive to measurements provided by the sensor, adjusts the rate of mixing provided by the large mixing bubbles. In some aerobic embodiments, the controller, responsive to measurements from the sensor, further adjusts the rate of oxygenation supplied to the wastewater by the tiny aerating bubbles.

3 Claims, 6 Drawing Sheets

MIXER AND PROCESS CONTROLLER FOR USE IN WASTEWATER TREATMENT PROCESSES

CROSS REFERENCE TO RELATED APPLICATION

This application claims priority from U.S. provisional application No. 60/681,717, filed May 16, 2005, entitled MIXER AND PROCESS CONTROLLER FOR USE IN WASTEWATER TREATMENT PROCESSES.

BACKGROUND

Water is frequently used to transport unwanted materials—waste—to a facility where the waste is removed or neutralized in the water. For example, water carries most sewage and industrial waste, such as chemicals, in the form of wastewater to a treatment facility where the water is treated and then returned to the environment for future use. The wastewater treatment process typically includes three general phases. The first phase, or primary treatment, involves mechanically separating the dense solids in the wastewater from the less dense solids and liquid in the wastewater. This is typically done in sedimentation tanks with the help of gravity. The second phase, or secondary treatment, involves the biological conversion of carbonaceous and nutrient material in the wastewater to more environmentally friendly forms. This is typically done by promoting the consumption of the carbonaceous and nutrient material by bacteria and other types of beneficial organisms already present in the wastewater or mixed into the wastewater. The third phase, or tertiary treatment, involves removing the remaining pollutant material from the wastewater. This is typically done by filtration and/or the addition of chemicals and/or UV light and/or Ozone to neutralize harmful organisms and/or remove pollutant material.

The second phase of the wastewater treatment process typically includes an aerobic—with oxygen—portion in which bacterial and other microorganisms are provided dissolved oxygen to promote their consumption of the carbonaceous and nutrient materials, and an anoxic—oxygen from a nitrate/nitrite source—portion in which the bacteria and other microorganisms use the oxygen in the nitrate/nitrite for their metabolic functions. The second phase may also include an anaerobic—without oxygen—portion in which bacteria and other microorganisms metabolically function without oxygen. The aerobic, anoxic and anaerobic portions are typically carried out in tanks that are divided into aerobic, anoxic and anaerobic zones. The tank may include one zone in which the aerobic portion operates and one in which the anoxic portion operates and one in which the anaerobic portion operates, or the tank may include any combination of any number of these zones. In some applications, a tank may be solely dedicated to one of the three aerobic, anoxic and anaerobic portions.

In the aerobic process, wastewater that includes ammonium ($NH_4$) and organic waste containing nitrogen, for example Urea (($NH_2$)$_2$CO), enters the aerobic zone. In the presence of dissolved oxygen ($O_2$), bacteria and other microorganisms convert the ammonium into nitrate ($NO_3$) via nitrite ($NO_2$). The nitrate can then be anoxically processed into nitrogen gas ($N_2$), which is harmless in the environment. A blower and diffusers supply the dissolved oxygen to the wastewater. The blower provides air to the diffusers, and the diffusers generate and release tiny bubbles so that the oxygen in the bubbles will dissolve in the wastewater. As the aerobic process progresses, the amount of ammonium in the wastewater decreases while the amount of nitrate and dissolved oxygen increases. The amount of dissolved oxygen increases because the demand for the dissolved oxygen decreases as the amount of nitrate increases. After most of the ammonium has been converted into nitrate, the wastewater is ready to be anoxically processed.

In the anoxic process, wastewater that includes nitrate and the organic waste containing nitrogen enters the anoxic zone. In the absence of dissolved oxygen, bacteria and other microorganisms convert the nitrate into nitrogen gas and the organic waste containing nitrogen into ammonium. As the anoxic process progresses, the amount of nitrate decreases and the amount of ammonium increases. After most of the nitrate has been converted into nitrogen gas, the wastewater is ready to be aerobically processed or treated in the tertiary treatment phase.

Mixing the contents in each of the aerobic and anoxic zones promotes the conversion reactions in each zone by increasing the contact of the components, such as the dissolved oxygen (aerobic zone), nitrite/nitrate (anoxic zone), wastewater, and bacteria and other microorganisms, with the other components in each zone. In the aerobic zone, the wastewater is typically mixed by the movement of the tiny bubbles through the wastewater and a mechanical mixer that includes a screw or blade that is turned by a motor. In the anoxic zone, a mechanical mixer typically only mixes the wastewater because the anoxic process requires little or no dissolved oxygen, which is provided in the aerobic zone by the tiny bubbles from the diffusers.

During the aerobic process, the amount of dissolved oxygen and ammonium in the wastewater, along with the total suspended solids (TSS) of the wastewater, are monitored to determine whether the amount of dissolved oxygen injected into the wastewater needs to be increased or decreased, whether or not the wastewater is ready to be processed anoxically, and whether or not the wastewater should be mixed more aggressively. Similarly, during the anoxic process, the amount of nitrate and ammonium in the wastewater, and the TSS of the wastewater are monitored to determine whether or not the wastewater is ready to be processed aerobically or treated in the tertiary phase, and whether or not the wastewater should be mixed more aggressively. With this information, one then determines whether or not to inject more tiny bubbles into the wastewater to increase the amount of dissolved oxygen or to more aggressively mix the wastewater. If the amount of dissolved oxygen in the wastewater should be increased, then the operator turns up the blowers to the diffusers. If the wastewater should be more aggressively mixed, then the operator turns up the blower and/or mechanical mixer.

To monitor these process parameters, one periodically retrieves a sample of the wastewater from the processing zone, analyzes the sample, and then evaluates the results. Alternatively, sensors located in the aerobic and anoxic zones can periodically sense the desired parameter and provide the information to an operator, who then analyses and evaluates the information.

Disadvantageously, the prior art practice of having someone monitor the aerobic and anoxic process parameters and adjust the output of the blowers and mechanical mixers is time consuming and unnecessarily expensive. Because someone analyzes and evaluates the process parameters and then adjusts the blowers and mechanical mixers accordingly, the process takes time to complete resulting in concomitant costs in time and labor. Thus, for economical reasons, in practice the number of times the aerobic and anoxic process parameters are retrieved, analyzed and evaluated is kept to a minimum. If sensors are used someone typically still has to analyze and evaluate the information the sensors provide and then accordingly adjust the blower to the diffusers and/or mechanical mixer.

Furthermore, the typical prior art means for mixing the wastewater in the aerobic and anoxic zones is subject to several limitations. Mixing the aerobic zone with the movement of the tiny bubbles through the wastewater requires a substantial amount of tiny bubbles to be injected into the wastewater to sufficiently mix the wastewater. Disadvantageously, the demand for dissolved oxygen in the wastewater may decrease to the point where the amount of tiny bubbles injected into the wastewater to satisfy the demand would not be enough to sufficiently mix the wastewater. When this happens the amount of tiny bubbles injected into the wastewater is typically kept high enough to sufficiently mix the wastewater. Thus, the diffusers consume more power than required to oxygenate the wastewater and can inject more dissolved oxygen into the aerobic zone than required.

Mixing the aerobic and anoxic zones with a mechanical mixer consumes a large amount of power relative to the amount of wastewater that it mixes, and often mixes some, but not all, of the wastewater in each zone. Thus, some of the sludge in the aerobic and anoxic zones remains on the bottom of the tank after it settles there. In the aerobic zone, the settled sludge can plug some of the diffusers. This can reduce the amount of dissolved oxygen injected into the wastewater, and thus requires one to clear the plugged diffusers. Furthermore, when sensors are used to measure wastewater parameters, settled sludge can clog the sensors, resulting in erroneous wastewater parameter measurements.

BRIEF SUMMARY OF THE INVENTION

In one aspect of the invention, a system for treating wastewater includes a tank having an aerobic zone in which bacteria and other microorganisms convert pollutants in the presence of dissolved oxygen, and an anoxic zone in which bacteria and other microorganisms convert pollutants in the absence of dissolved oxygen to a more environmentally friendly form. The system also includes a blower and diffusers to inject dissolved oxygen into the aerobic zone, a mixer that generates large mixing bubbles, and a control system to monitor the aerobic and anoxic processes and adjust, accordingly, the output of the blower and mixer. For example, the control system can monitor the amount of ammonium and dissolved oxygen as the aerobic process progresses in the aerobic zone of the tank, and can monitor the amount of nitrate and ammonium as the anoxic process progresses in the anoxic zone of the tank. With the information obtained by monitoring these process parameters, the control system can then adjust the output of the blower and mixer accordingly. With the control system retrieving, analyzing and evaluating the process parameters, and then adjusting the output of the blower and mixer accordingly, someone does not have to perform these functions as the system treats wastewater.

The mixer generates large mixing bubbles, for example a bubble having a largest dimension of 6 inches to 10 feet, and is located in the aerobic and anoxic zones. The mixing bubbles are large enough to move wastewater as they rise to the surface and generate a mixing current in the wastewater. The mixing current mixes the wastewater, and bacteria and other microorganisms to promote the bacteria and other microorganisms' conversion of the pollutants contained in the wastewater. Because the mixer requires less energy than a typical mechanical mixer, the mixer costs less to operate.

With the mixer mixing the wastewater in the aerobic zone the output of the blower can be reduced to match the demand for dissolved oxygen, which may be below the output required to mix the wastewater. In addition, the mixing bubbles are large enough that the amount of oxygen that they release into the wastewater as they move through it is negligible. Thus the anoxic portion remains anoxic as the large bubbles from the mixer rise toward the surface of the wastewater.

In another aspect of the invention, the system for treating wastewater can include a tank having one zone that can change processes over time as desired. For example, during the first six hours of a daily cycle, the tank can be used to aerobically process the wastewater and then during the next six hours of the daily cycle the tank can be used to anoxically process the wastewater. The ability to have the same zone of the tank available to process the wastewater aerobically and anoxically allows the wastewater treatment process to easily adapt to fluctuations in the amount of wastewater that can enter the treatment facility over time.

BRIEF DESCRIPTION OF THE DRAWINGS

The foregoing objects, as well as further objects, advantages, features and characteristics of the present invention, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE PREFERRED EMBODIMENTS

Figure 1:
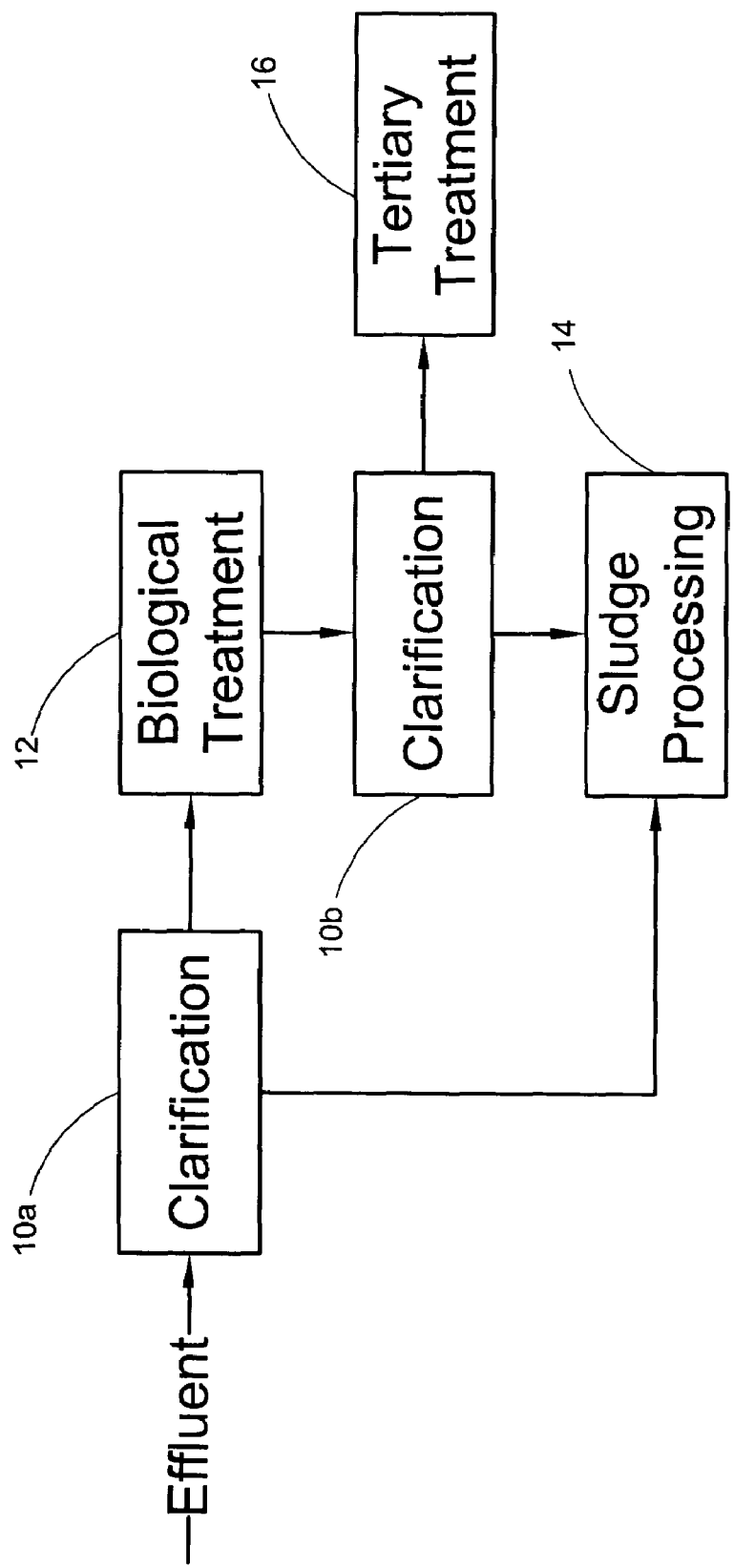
FIG. 1 is a schematic diagram of a typical wastewater treatment plant that includes a primary treatment process, a secondary treatment process, a tertiary treatment process, and a waste sludge treatment process.

FIG. 1 is a schematic diagram of a wastewater treatment process that includes a primary treatment process, a secondary treatment process and a tertiary treatment process. The primary treatment process includes a clarification stage 10a to separate dense portions of the wastewater, typically heavy solids, from less dense portions of the wastewater, typically light solids and liquid. The secondary treatment process includes a biological nutrient conversion stage 12 that converts the biological nutrient material contained in the light solids and liquid into a more environmentally friendly form. For example, in one embodiment, wastewater is first clarified into heavy solids, and light solids and liquid, in the clarification stage 10a using conventional techniques. The heavy solids are directed to a sludge processing stage 14 that processes the heavy solids using conventional techniques. The light solids and liquid are directed to the biological nutrient conversion stage 12 where they are subject to an aerobic and anoxic conversion process as discussed in greater detail in conjunction with FIGS. 2 and 3. During the biological nutrient conversion stage 12, the bacteria and other microorganisms convert the nutrient material contained in the wastewater to a form that is more environmentally friendly. From the biological nutrient conversion stage 12, the wastewater is directed to another clarification stage 10b that clarifies the liquid and any remaining heavy and light solids using conventional techniques. From the clarification stage 10b, the heavy sludge, which contains a predominance of bacteria, is partially directed to the sludge processing stage 14 that processes the heavy solids using conventional techniques and partially returned to the secondary treatment stage. The very light solids, along with liquid that does not contain excessive amounts of biologically nutrient material, is directed to the tertiary treatment process 16 where remaining pollutant material is removed from the wastewater.

Figure 2:
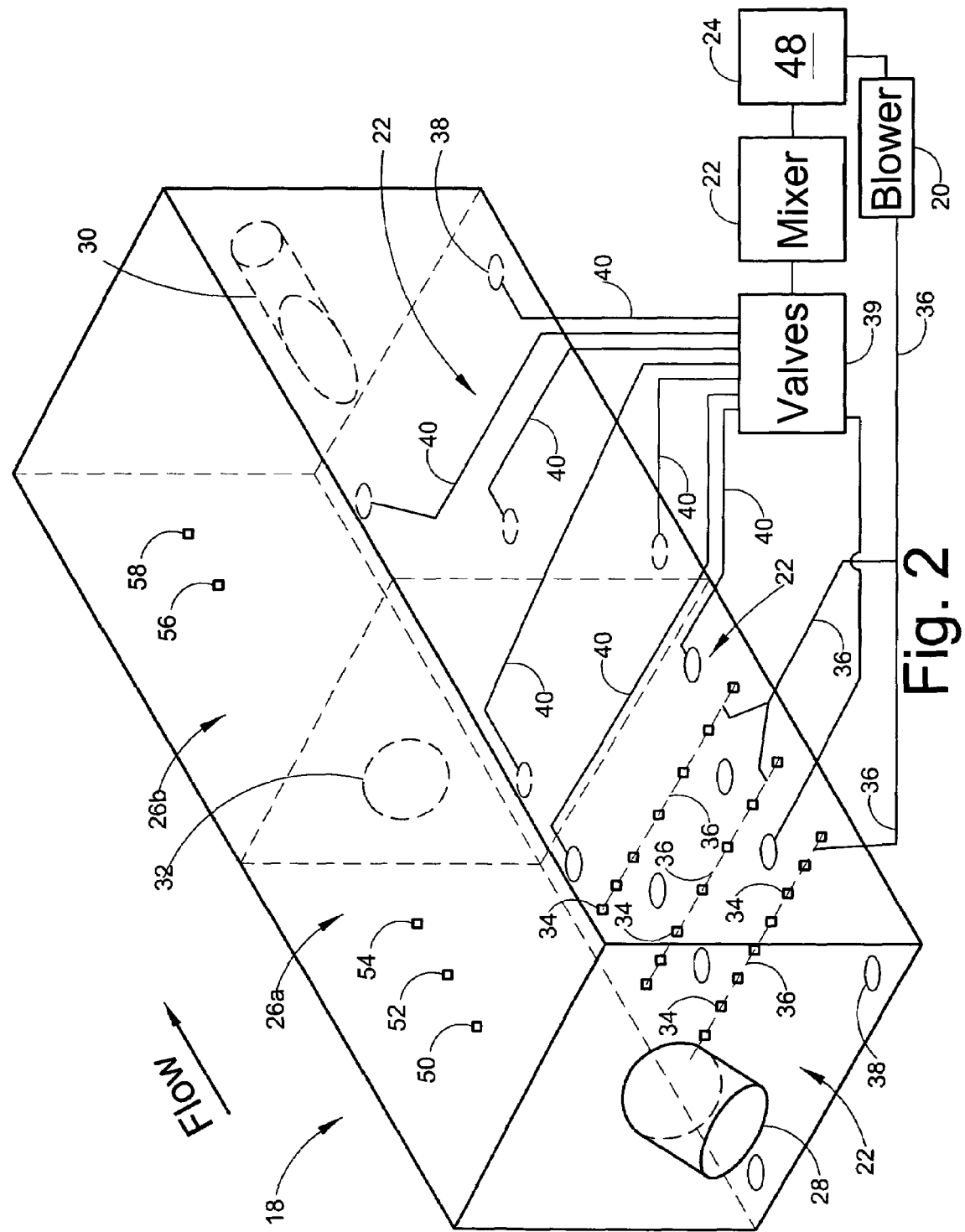
FIG. 2 is a perspective view of a tank, a blower, a mixer, and a control system that are included in a system for treating wastewater, according to an embodiment of the invention.

FIG. 2 is a perspective view of a tank 18, a blower 20, a mixer 22, and a control system 24 that are included in a system for treating wastewater, according to an embodiment of the invention. The tank 18 includes zones 26a and 26b in which bacteria and other microorganisms aerobically and anoxically convert pollutants in the wastewater to more environmentally friendly forms. In one embodiment, for example, the tank 18 includes two zones 26a and 26b, an inlet 28 through which wastewater enters the tank 18, an outlet 30 through which wastewater exits the tank 18 after flowing through the zones 26a and 26b, and a portal 32 through which the wastewater leaves the zone 26a and enters the zone 26b. The zone 26a includes bacteria and other microorganisms (not shown) that aerobically convert pollutants in the wastewater, and the zone 26b includes bacteria and other microorganisms (not shown) that anoxically convert pollutants in the wastewater.

In addition, an Integrated Fixed-film Activating Sludge (IFAS) system that includes media (omitted for clarity) may exist in zones 26a and 26b. The media provides the bacteria and other microorganisms (not shown) a structure to hold onto and may be freely suspended in the wastewater. In other embodiments, the IFAS may include a net or web (not shown) that is anchored in the zones 26a and 26b. In still other embodiments the IFAS may include both the net or web and the media.

The blower 20 delivers air to the diffusers 34 (22 shown but only four labeled with a reference number for clarity) via distribution lines 36. The diffusers 34 generate tiny bubbles (not shown) that travel through the wastewater toward the surface of the wastewater. As the tiny bubbles ascend through the wastewater, they release oxygen into the wastewater. Once the oxygen is in the wastewater, the bacteria and other microorganisms can use it to convert ammonium into nitrate.

Figure 6:
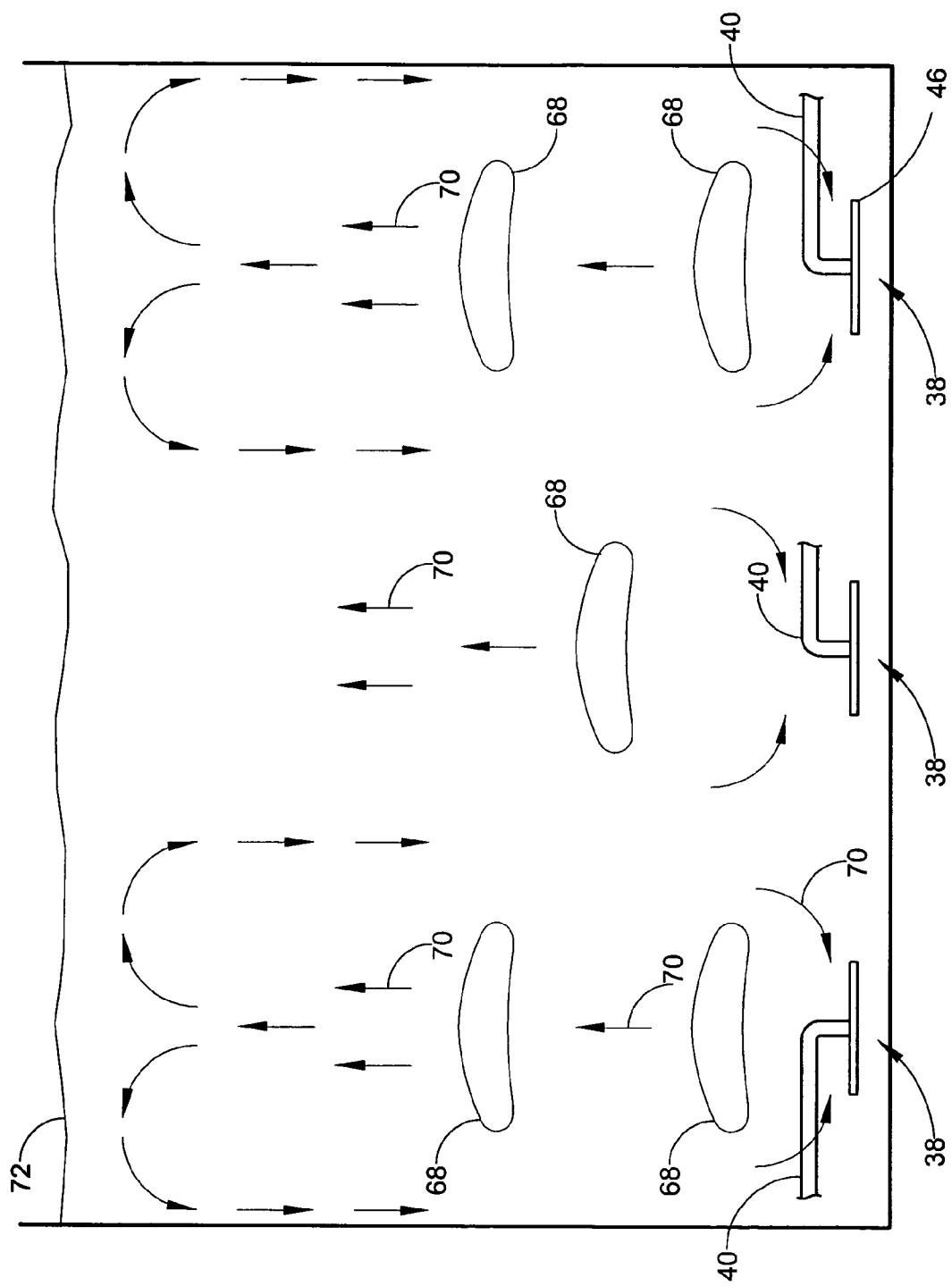
FIG. 6 shows an embodiment with mixing bubbles that are generated by a mixer traveling through wastewater and mixing the wastewater.

The mixer 22 injects any fluid, such as air, that is less dense than the combination of the wastewater, bacteria and other microorganisms to generate large mixing bubbles (discussed in greater detail in conjunction with FIG. 6). The mixing bubbles are large enough to move a substantial amount wastewater as they rise toward the wastewater's surface, and thus generate a mixing current in the wastewater. The mixing current mixes the wastewater, bacteria and other microorganisms to promote biological activity for removal of pollutants from the wastewater.

Figure 5:
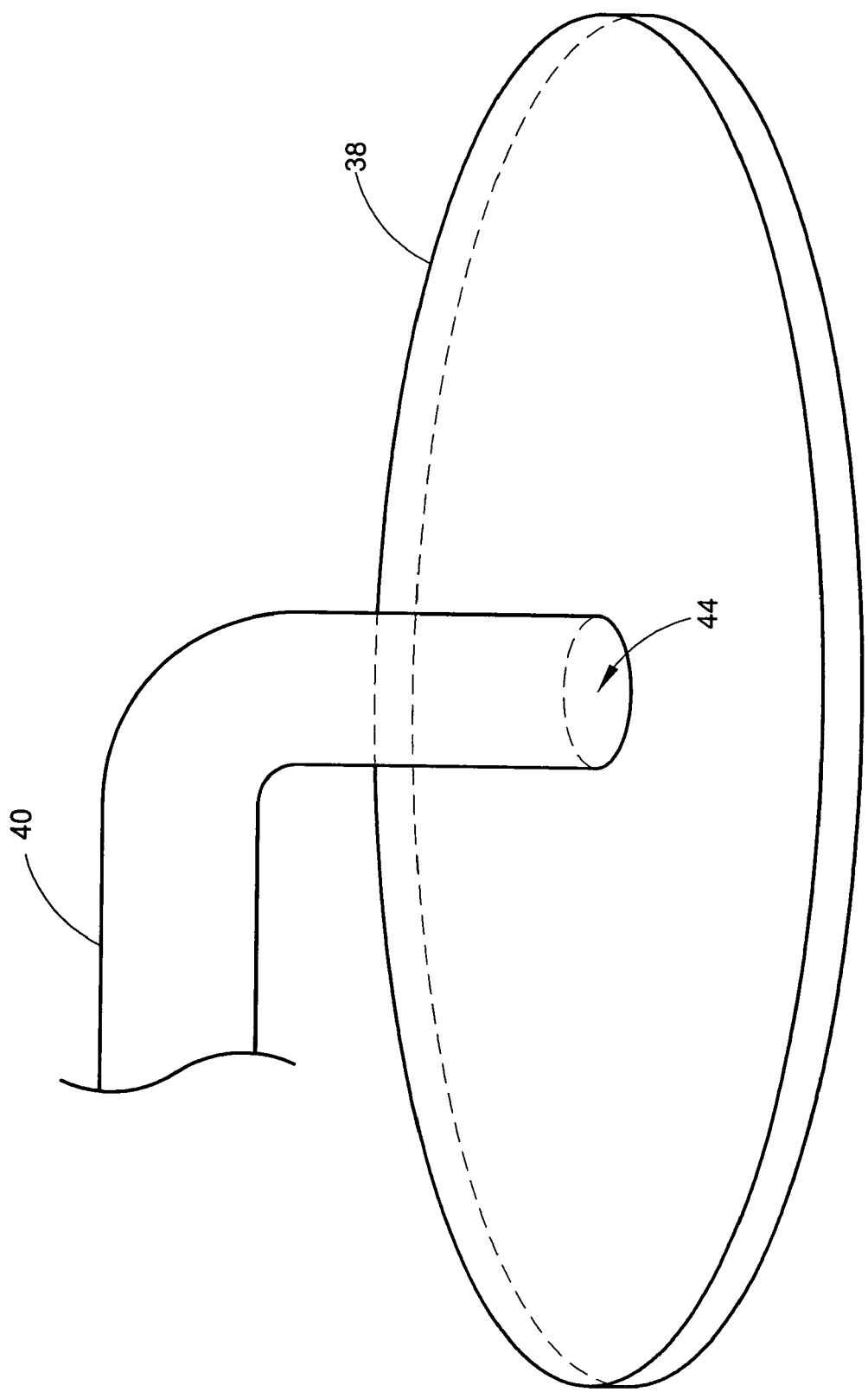
FIG. 5 is a perspective view of a forming plate that is included in the mixer in FIG. 2, according to an embodiment of the invention.

The mixer 22 includes a forming plate 38 to form mixing bubbles from the injected fluid, and a valve 39 to permit or prevent the fluid from reaching the forming plate 38. The mixer 22 also includes a distribution line 40 to supply the forming plate 38 with the fluid when the corresponding valve 39 is open. Each forming plate 38, one embodiment of which is shown in FIG. 5, includes an orifice 44. When the valve 39 is opened, air flows through the distribution line 40 toward the forming plate 38, and then exits the distribution line 40 through the orifice 44. The forming plate 38 prevents the air from rising toward the surface of the wastewater until the valve 39 injects more air than the forming plate 38 can hold, at which time most of the air escapes from under the forming plate 38 and forms a large mixing bubble. The large mixing bubble then rises toward the surface of the wastewater. When the valve 39 is closed, air does not flow through the orifice 44. For additional discussion on the forming plate 38 and an embodiment of an injector see U.S. Pat. No. 6,629,773, titled IMPROVED METHOD AND APPARATUS FOR GAS INDUCED MIXING AND BLENDING OF FLUIDS AND OTHER MATERIALS, issued to Parks on 7 Oct. 2003, which is herein incorporated in its entirety.

Still referring to FIG. 2, the forming plates 38 may be arranged throughout the aerobic and anoxic zones 26a and 26b as desired to provide any desired mixing current arrangement. In one embodiment, the forming plates 38 are located a few inches above the bottom of the tank 18. The forming plates 38 each may be located closer to the bottom of the tank 18 or further away from the bottom of the tank 18 in either or both zones. Preferred embodiments employ one or more forming plates 38 located on the bottom of tank 18 or at most a few inches above the bottom, in order to maximize the efficacy of the mixing afforded by the large bubbles.

As depicted in a preferred embodiment, the forming plates 38 are spatially arranged in the anoxic zone 26b to form a rectangle with an additional forming plate 38 located in the middle of the rectangle. As will be appreciated by those in the art, numerous other spatial arrangements of the plates 38 are possible in each zone, including circular and other arrangements, as required for a given wastewater treatment system configuration.

Still referring to FIG. 2 the valves 39 may also be opened and closed in any desired sequence to provide any desired mixing current within each of the zones 26a and 26b. For example, in one embodiment, four valves 39 corresponding to the four forming plates 38 in the anoxic zone 26b that are closest to the sidewalls of the tank 18 may first permit air to flow toward the forming plates 38. Then, after these valves 39 have closed, the remaining valves 39 that correspond to the remaining forming plates 38 may permit air to flow toward the forming plates 38. This sequence would cause a turbulence in the mixing currents generated by the four forming plates 38 and may promote mixing the wastewater, bacteria and other microorganisms through out the anoxic zone 26b.

The control system 24 monitors the aerobic and the anoxic processes that occur in the respective zones 26a and 26b of the tank 18. The control system 24 includes a controller 48 (discussed in greater detail in conjunction with FIGS. 3 and 4) that analyses and evaluates information regarding process parameters of both the aerobic and anoxic processes as these processes progress, and accordingly adjusts the output of the blower 20 and mixer 22. The control system 24 also includes sensors 50, 52, 54. 56 and 58 located in respective zone 26a and 26b of the tank 18 to sense certain process parameters and convey the information to the controller 48 via conventional means (not shown). Suitable sensors may be obtained from WTW Wissenschaftlich-Technische Werkstätten GmbH, of Weilheim, Germany.

In one embodiment, the sensors 50, 52 and 54 are located in the aerobic zone 26a, and sensors 56 and 58 are located in the anoxic zone 26b. Sensor 50 senses the presence of dissolved oxygen in the wastewater in the aerobic zone 26a, sensor 52 senses the presence of ammonium, and sensor 54 senses turbidity, which, as is known to those of skill in the art, correlates to total suspended solids (TSS). Sensor 56 senses the presence of nitrate in the wastewater in the anoxic zone 26b and sensor 58 also senses turbidity to measure TSS. For additional discussion on the control system 24 see PCT Patent Application PCT/US2004/011248, titled APPARATUS AND METHOD FOR GAS INDUCED MIXING AND AGITATING OF A FERMENTING JUICE IN A TANK DURING VINIFICATION, filed 8 Apr. 2004 which is herein incorporated in its entirety.

Figure 3:
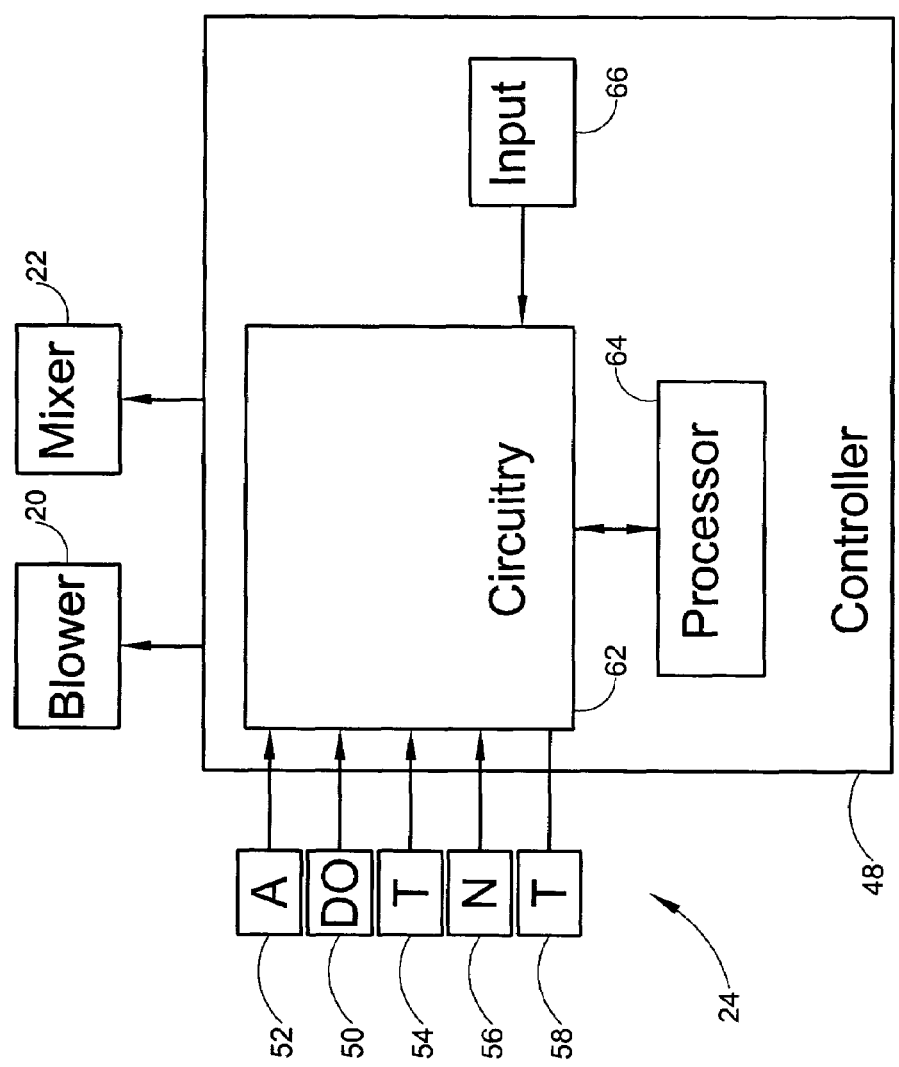
FIG. 3 is a schematic diagram of the control system in FIG. 2, according to an embodiment of the invention.

FIG. 3 is a schematic diagram of the control system 24 in FIG. 2, according to an embodiment of the invention. The control system 24 includes the sensors 50-58 and a controller 48 to analyze and evaluate the data generated by the sensors 50-58, and generate instructions to adjust the outputs of the blower 20 and the mixer 22. The controller 48 includes circuitry 62 that can store and generate data and instructions based on the data the circuitry receives from the sensors 50-58, and a processor 64 to execute instructions stored or generated in the circuitry 62. The controller 48 also includes an input 66 that one can use to enter data into the circuitry 62. For example, in one embodiment, one can enter limits for the amount of dissolved oxygen, ammonium and nitrate that the controller 48 can compare with respective amounts determined to exist in the wastewater. One can also enter a limit for the degree of total suspended solids (TSS) in the wastewater in each of the zones 26a and 26b that the controller 48 can compare with the degree of TSS determined in each of the zones 26a and 26b. One can also enter a limit for the outputs of the blower 20 and mixer 22 that the controller 48 can compare with the output that the controller 48 determines should be used based on the data from the sensors 50-58.

In other embodiments, the control system 24 may include a set of instructions to switch the data and instructions stored and generated by the circuitry 62 from those used to monitor an aerobic or anoxic process to those used to monitor an anoxic or aerobic process, respectively. This may be desirable when the tank 18 includes one zone that processes wastewater aerobically for a period of time and then process the wastewater anoxically for another period of time.

Figure 4:
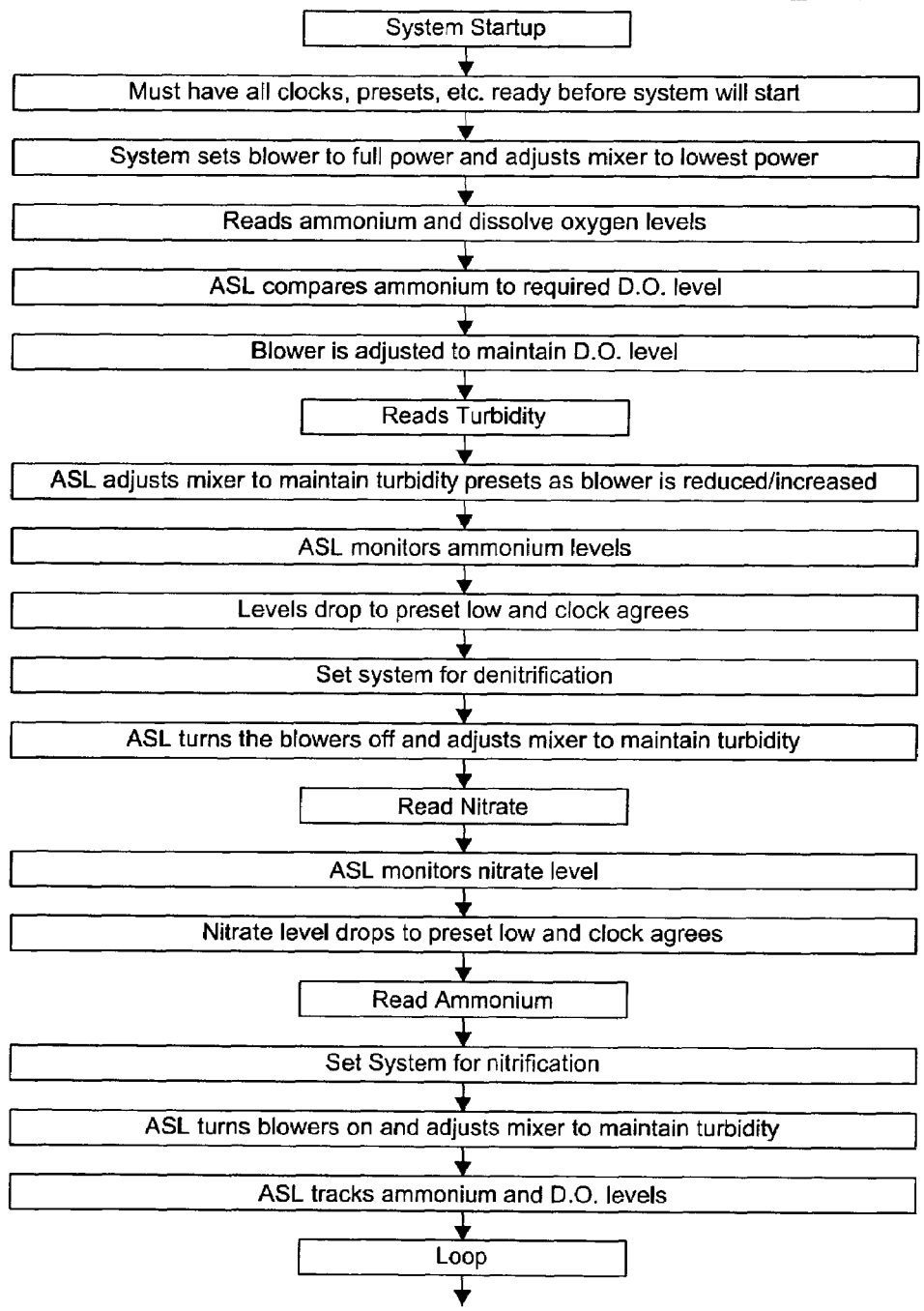
FIG. 4 is a flow chart of how the control system in FIGS. 2 and 3 monitors the aerobic and anoxic processes and accordingly adjusts the output of the blower and mixer, according to an embodiment of the invention.

FIG. 4 is a flow chart of the control system in FIGS. 2 and 3 monitoring the aerobic and anoxic processes, and accordingly adjusting the output of the blower and mixer, according to an embodiment of the invention. In operation, the control system 24 can monitor the aerobic process while it monitors the anoxic process (as shown in FIG. 2), and can accordingly and independently adjust the blower and mixer outputs in the aerobic zone 26a relative to the mixer output in the anoxic zone 26b. As previously discussed, in other embodiments, the control system 24 can sequentially monitor one of the conversion processes and accordingly adjust the mixer's output or the blower and mixer's output, whichever is applicable.

In one embodiment, the control system 24 monitors the amount of TSS determined to be in the wastewater in the aerobic and anoxic zones 26a and 26b (FIG. 2) during the aerobic and anoxic processes. When the level of TSS is determined to be less than a desired predetermined degree, the control system 24 instructs the mixer 22 to change one or more of the bubble generation parameters that the mixer 22 uses to generate mixing bubbles (discussed greater detail in conjunction with FIG. 6) to increase the TSS. For example, the mixer 22 may increase the frequency of the mixing bubbles that one or more of the forming plates 38 (FIG. 2) generates and releases into the wastewater. When the level of TSS is determined to be greater than a desired predetermined degree, the control system 24 instructs the mixer 22 to change one or more of the bubble generation parameters to decrease the TSS. For example, the mixer 22 may decrease the size of each mixing bubble that one or more forming plates 38 generates and releases. The one or more bubble generation parameters that the control system 24 chooses to have the mixer 22 change depends on many variables that include the difference between the determined level of TSS and the desired level, how quickly one wants to correct this difference, and the capability of the mixer 22.

In one embodiment, the control system 24 monitors the amount of dissolved oxygen and ammonium determined to be in the wastewater in the aerobic zone 26a (FIG. 2) during the aerobic process. The control system 24 then compares the determined amounts of ammonium and dissolved oxygen in the wastewater and then accordingly adjusts the output of the blower 20 (FIG. 2). When the amount of ammonium is greater than a desired predetermined amount, and the amount of dissolved oxygen is less than a desired predetermined amount, the control system 24 instructs the blower 20 to change one or more of the parameters that define the airflow toward the diffusers to increase the amount of dissolved oxygen in the wastewater. For example, the blower 20 may increase the flow rate of air to the diffusers 34 (FIG. 2) or the blower 20 may deliver air that has a higher concentration of oxygen to the diffusers 34. When the amount of ammonium and dissolved oxygen is greater than respective, desired predetermined amounts, the control system 24 instructs the blower 20 to change one or more of the bubble generation parameters to decrease the amount of dissolved oxygen. When the amount of ammonium is less than a desired predetermined amount, and the amount of dissolved oxygen is greater than a desired predetermined amount, the control system 24 instructs the blower 20 to change one or more of the parameters that define the airflow toward the diffusers to decrease the amount of dissolved oxygen in the wastewater. When the amount of ammonium and dissolved oxygen is less than respective, desired predetermined amounts, the wastewater is ready to be anoxically processed, and the control system 24 confirms that this portion of the wastewater is about to enter the anoxic zone 26b. In other embodiments, the control system 24 switches from monitoring the aerobic process to monitoring the anoxic process while the wastewater remains in the same zone of the tank.

In one embodiment, the control system 24 monitors the amount of nitrate determined to be in the wastewater in the anoxic zone 26b during the anoxic process. When the amount of nitrate exceeds a desired predetermined amount, the control system 24 confirms that this portion of the wastewater still has a significant amount of processing time to progress through. When the amount of nitrate is less than a desired predetermined amount, the control system 24 confirms that this portion of the wastewater is ready to leave the anoxic zone 26b. If the amount of ammonium, which the control system 24 may also monitor in the anoxic zone, exceeds a desired predetermined amount, the wastewater is ready to be aerobically processed again, and the control system confirms that the wastewater is about to enter another aerobic zone (not shown). In other embodiments, the control system 24 switches from monitoring the aerobic process to monitoring the anoxic process while the wastewater remains in the same zone of the tank.

In addition, in one embodiment of the control system 24 the control system monitors the time of day that it receives specific data from the sensors 50-58 and analyzes and evaluates the data. By keeping track of the time of day, the control system 24 can compare the data it receives and generates with data that it should receive and generate for the time of day, and can determine whether or not a malfunction in the sensors 50-58, blower 20, mixer 22 and control system 24 might exist.

FIG. 6 is a view of one of the zones 26a and 26b in FIG. 2. The mixing bubbles 68 generate the mixing currents indicated by the arrows 70 (28 arrows shown but only 5 labeled with the reference number 70 for clarity) that mix the wastewater 72, bacteria (omitted for clarity) and other microorganisms (also omitted for clarity). The strength of the mixing currents depends on the speed at which each mixing bubble 68 travels through the wastewater and the size of each bubble 68.

The speed of the mixing bubble 68 depends on the density of the fluid relative to the density of the wastewater 72, and the bubble's shape. The greater the difference between the densities of the wastewater 72 and the fluid, the faster the mixing bubbles 68 rise through the wastewater 72. The more aerodynamic the shape of the bubble 68 becomes, the faster the bubble 68 rises through the wastewater 72. For example, in one embodiment, the bubble 68 forms an oblate sphere—a sphere whose dimension in the vertical direction is less than the dimension in the horizontal direction. In other embodiments, the bubble 68 forms a distorted oblate sphere having the trailing surface—the surface of the bubble 68 that is the rear of the bubble 68 relative to the direction the bubble 68 moves—that is convex when viewed from the direction that the bubble 68 moves.

The size of the mixing bubble 68 depends on the flow rate of the fluid into the wastewater 72. The flow rate depends on the size of the orifice 44 and the fluid's injection pressure. As one increases the fluid-injection pressure, one increases the amount of fluid injected into the wastewater 72 over a specific period of time that the valve 39 is open. And, as one increases the area of the orifice 44, one increases the amount of fluid injected into the wastewater 72 over a specific period of time that the valve 39 is open. As one increases the diameter of the forming plate 38 one increases the amount of fluid the forming plate 38 can hold before the fluid escapes it. For example, in one embodiment the size of the bubble 68 is approximately 6 inches across its largest dimension. In other embodiments, the bubble 68 is approximately 10 feet across it largest dimension.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

We claim:

1. A system for treatment of wastewater, the system comprising:
    a tank containing at least one wastewater treatment zone, the zone having an upper portion and a lower portion;
    a means for controllably generating large mixing bubbles of six inches or greater in diameter within the lower portion of the wastewater treatment zone;
    at least one sensor providing measurements of a wastewater treatment parameter; and
    a controller receiving the measurements provided by the sensor, the controller adapted to control the generation of the large mixing bubbles responsive to measurements provided by the sensor.

2. A system according to claim 1, wherein at least one wastewater treatment zone is aerobic and further comprising diffusers for controllably oxygenating the aerobic wastewater treatment zone, the controller further adapted to control the oxygenation of the wastewater responsive to measurements provided by the sensor.

3. A system for treatment of wastewater, the system comprising
    a tank containing an aerobic wastewater treatment zone, the zone having an upper portion and a lower portion;
    an adjustable oxygenating means for providing oxygen to liquid in the wastewater treatment zone;
    an adjustable mixing means for generating large mixing bubbles of at least six inches in diameter within the lower portion of the wastewater treatment zone;
    at least one sensor providing measurements of a wastewater treatment parameter; and
    a controller receiving the measurements provided by the at least one sensor, the controller adapted to adjust the oxygenating means and the mixing means responsive to measurements provided by the sensor.

* * * * *